United States Patent
Yang et al.

(10) Patent No.: US 8,843,735 B2
(45) Date of Patent: *Sep. 23, 2014

(54) METHOD AND APPARATUS OF COMMUNICATING SECURITY/ENCRYPTION INFORMATION TO A PHYSICAL LAYER TRANSCEIVER

(75) Inventors: Li-Jau Yang, San Jose, CA (US); Daniel C. Biederman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 258 days.

This patent is subject to a terminal disclaimer.

(21) Appl. No.: 12/752,963

(22) Filed: Apr. 1, 2010

(65) Prior Publication Data

US 2010/0191956 A1 Jul. 29, 2010

Related U.S. Application Data

(62) Division of application No. 10/676,384, filed on Sep. 30, 2003, now Pat. No. 7,711,948.

(51) Int. Cl.
*H04L 29/06* (2006.01)

(52) U.S. Cl.
CPC .......... *H04L 63/0428* (2013.01); *H04L 63/162* (2013.01)
USPC ............................ 713/151; 713/164; 380/255

(58) Field of Classification Search
USPC ........................................................ 713/151
See application file for complete search history.

(56) References Cited

U.S. PATENT DOCUMENTS

| | | |
|---|---|---|
| 5,995,514 A | 11/1999 | Lo |
| 6,222,852 B1 | 4/2001 | Gandy |
| 6,240,513 B1 * | 5/2001 | Friedman et al. ............. 713/152 |
| 6,363,444 B1 | 3/2002 | Platko et al. |
| 7,711,948 B2 | 5/2010 | Yang et al. |
| 2004/0030805 A1 | 2/2004 | Fujimori et al. |
| 2004/0139313 A1 | 7/2004 | Buer et al. |
| 2005/0084076 A1 | 4/2005 | Dhir et al. |

FOREIGN PATENT DOCUMENTS

| | | |
|---|---|---|
| WO | WO 01/61935 | 8/2001 |
| WO | WO 0161935 A1 * | 8/2001 |

OTHER PUBLICATIONS

EP Supplemental Search Report dated Oct. 19, 2010, Appl. No. 04789512.3.
CA Office Action dated Feb. 12, 2010, Appl. No. 2,536,605.
CN Office Action dated Mar. 13, 2009, from CN Application No. 20040026215.5.
CN Office Action dated Aug. 28, 2009, from CN Application No. 20040026215.5.
Non-Final Office Action dated May 2, 2007, from related U.S. Appl. No. 10/676,384.
Non-Final Office Action dated Dec. 19, 2007, from related U.S. Appl. No. 10/676,384.

(Continued)

*Primary Examiner* — Yogesh Paliwal

(57) ABSTRACT

An apparatus for providing link layer security in a Physical Layer Transceiver (PHY) is disclosed. In one embodiment, the apparatus may comprise analog circuitry configured to interface with a data transmission medium, digital circuitry configured to interface with a Media Access Controller (MAC); and a crypto engine coupled to the digital circuitry. Single interface and multiple interface schemes are provided to control both PHY and crypto functions. Embodiments are disclosed where the PHY controls the crypto device, and where the crypto device controls the PHY.

21 Claims, 10 Drawing Sheets

(56) References Cited

OTHER PUBLICATIONS

Final Office Action dated Jul. 22, 2008, from related U.S. Appl. No. 10/676,384.

Non-Final Office Action dated May 11, 2009, from related U.S. Appl. No. 10/676,384.

Notice of Allowance dated Dec. 14, 2009, from related U.S. Appl. 10/676,384.

EP Supplemental Office Action dated Jan. 10, 2011, Appl. No. 04789512.3.

* cited by examiner

METHOD AND APPARATUS OF COMMUNICATING SECURITY/ENCRYPTION INFORMATION TO A PHYSICAL LAYER TRANSCEIVER

RELATED APPLICATIONS

This application is a divisional of U.S. application Ser. No. 10/676,384, filed on Sep. 30, 2003, entitled "Method and Apparatus of Communicating Security/Encryption Information to a Physical Layer Transceiver", which is incorporated herein by reference for all purposes.

BACKGROUND

1. Field of the Disclosure

The disclosure relates generally to link layer data communications.

2. The Prior Art

Background

Physical Layer Transceivers ("PHY" or "PHYs") are known in the art for transmitting and receiving data through various media, such as copper and fiber optic cables.

In a receive mode, the PHY functions as a device that receives data from the medium and decodes the data into a form appropriate for the receiving device. In a transmit mode, the PHY takes data from the device, typically from the Media Access Controller ("MAC"), and converts the data into a form appropriate for the medium in use.

FIG. 1 is a functional block diagram of a typical prior art PHY 100. The PHY 100 is typically configured to interface between the MAC 110 of the host device and the medium 120.

The PHY 100 typically includes analog circuitry 130 configured for receiving data from the medium 120 and decoding the data into a form appropriate for the host device using techniques known in the art. The PHY 100 further includes digital circuitry 140 configured for receiving data from the MAC 110 and converting the data into a form appropriate for the medium 120.

The PHY 100 further includes memory and control circuitry 150 configured to control the operation of the PHY, and in particular the digital circuitry 140. The memory and control circuitry 150 will typically include circuitry to interface with the MAC 110 through a bus interface 160, such as a Medium Independent Interface ("MII"), or a Gigabit Medium Independent Interface ("GMII").

BRIEF DESCRIPTION OF THE DRAWING FIGURES

DETAILED DESCRIPTION

Figure 1:
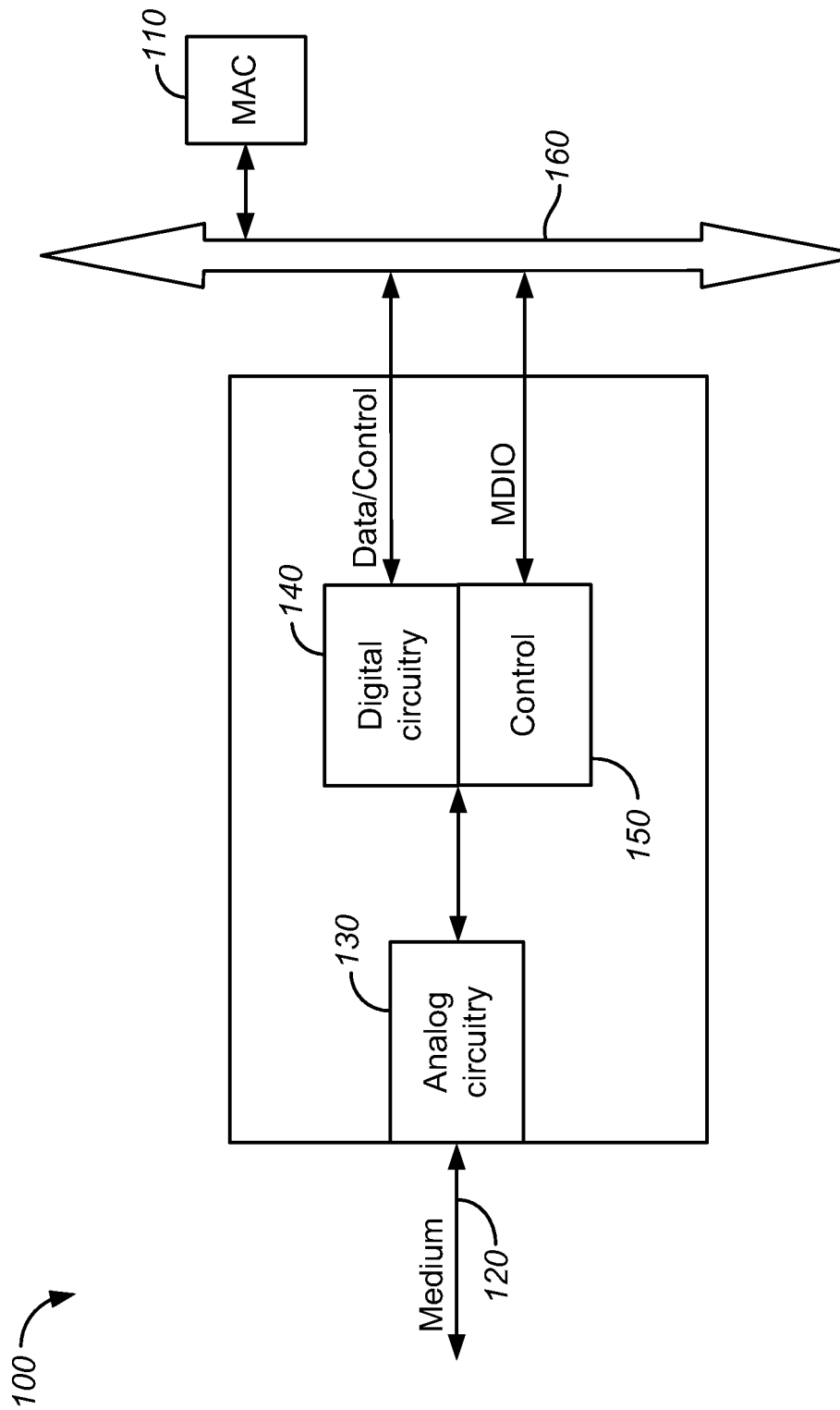
FIG. 1 is a conceptual block diagram of a prior art PHY.

Persons of ordinary skill in the art will realize that the following description is illustrative only and not in any way limiting. Other modifications and improvements will readily suggest themselves to such skilled persons having the benefit of this disclosure. In the following description, like reference numerals refer to like elements throughout.

This disclosure may relate to data communications. Various disclosed aspects may be embodied in various computer and machine readable data structures. Furthermore, it is contemplated that data structures embodying the teachings of the disclosure may be transmitted across computer and machine readable media, and through communications systems by use of standard protocols such as those used to enable the Internet and other computer networking standards.

The disclosure may relate to machine readable media on which are stored various aspects of the disclosure. It is contemplated that any media suitable for retrieving instructions is within the scope of the present disclosure. By way of example, such media may take the form of magnetic, optical, or semiconductor media, and may be configured to be accessible by a machine as is known in the art.

Various aspects of the disclosure may be described through the use of flowcharts. Often, a single instance of an aspect of the present disclosure may be shown. As is appreciated by those of ordinary skill in the art, however, the protocols, processes, and procedures described herein may be repeated continuously or as often as necessary to satisfy the needs described herein. Accordingly, the representation of various aspects of the present disclosure through the use of flowcharts should not be used to limit the scope of the present disclosure.

This disclosure provides security at the link layer of a system. In this regard, the link layer may be defined in accordance with the OSI reference standard. In particular, the I.E.E.E. 802.3 standard defines the link layer as devices residing between the MAC and medium, and is so defined herein.

In this disclosure, link layer security is provided in a transmission mode by encrypting data for confidentiality, authenticating data for integrity, or both as it is received from the MAC and prior being transmitted from the PHY. Conversely, in a receive mode, data is decrypted, authenticated, or both as it is received by the PHY, prior to presentation to the MAC.

Figure 2:
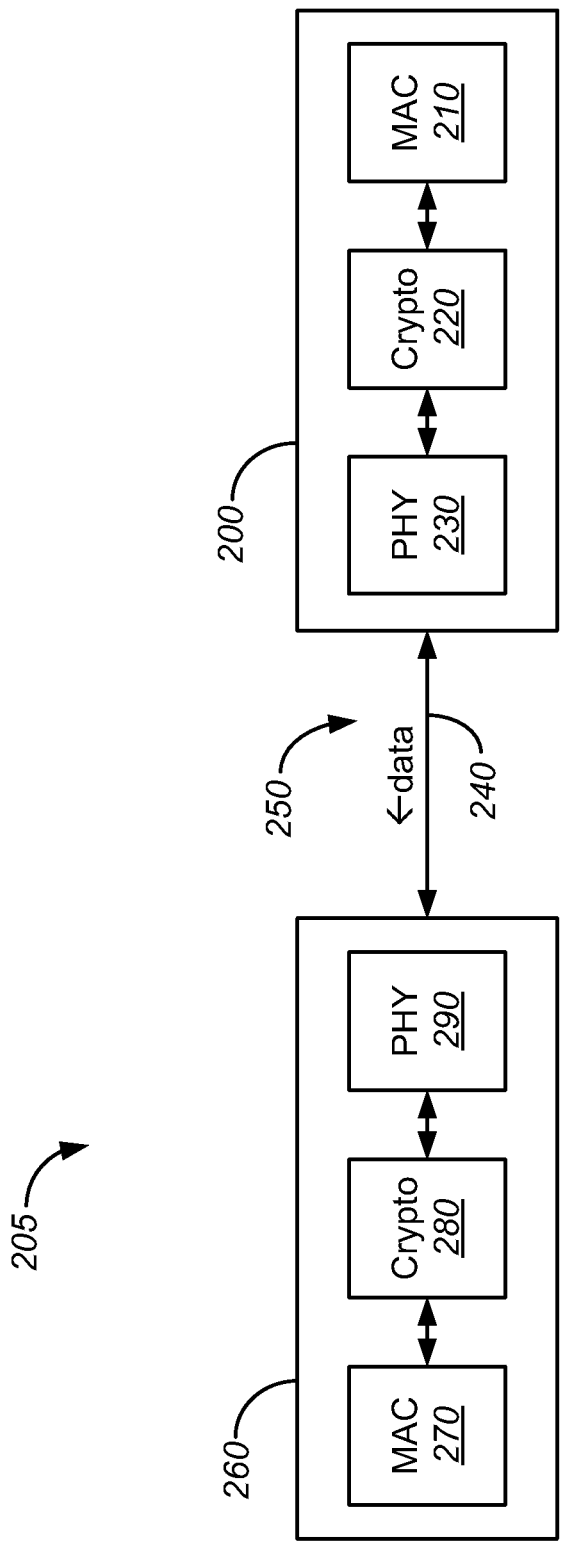
FIG. 2 is a conceptual block diagram of a data transmission system.

FIG. 2 is a diagram of a link layer data transmission system 205 configured in accordance with the teachings of this disclosure. The system 205 includes a transmitting device 200 coupled to a receiving device 260 through a medium 240.

The transmitting device 200 includes an ASIC configured to function as a MAC using techniques known in the art, and a PHY 230, such as that described in FIG. 1.

Coupled between the MAC 210 and the PHY 230 is a crypto device 220. The crypto device 220 is preferably configured to encrypt/authenticate the data packet 250 using DES, 3DES, MD5, SHA1, RC4, or AES, or other similar protocols.

In this example, the data packet is received by the crypto device 220 from the MAC 210, and encrypted/authenticated prior to being provided to the PHY 230 and transmitted onto medium 240.

The system 205 also includes a receiving device 260 that is configured similar to the transmitting device 200, including a MAC 270, a crypto device 280, and a PHY 290.

In the receiving device, the ciphered data packet 250 is received by the PHY 290 and provided to the crypto engine 280, where the data is decrypted/authenticated and provided to the MAC 270.

Of course, the operation disclosed in FIG. 2 may operate in the reverse path.

Figure 3:
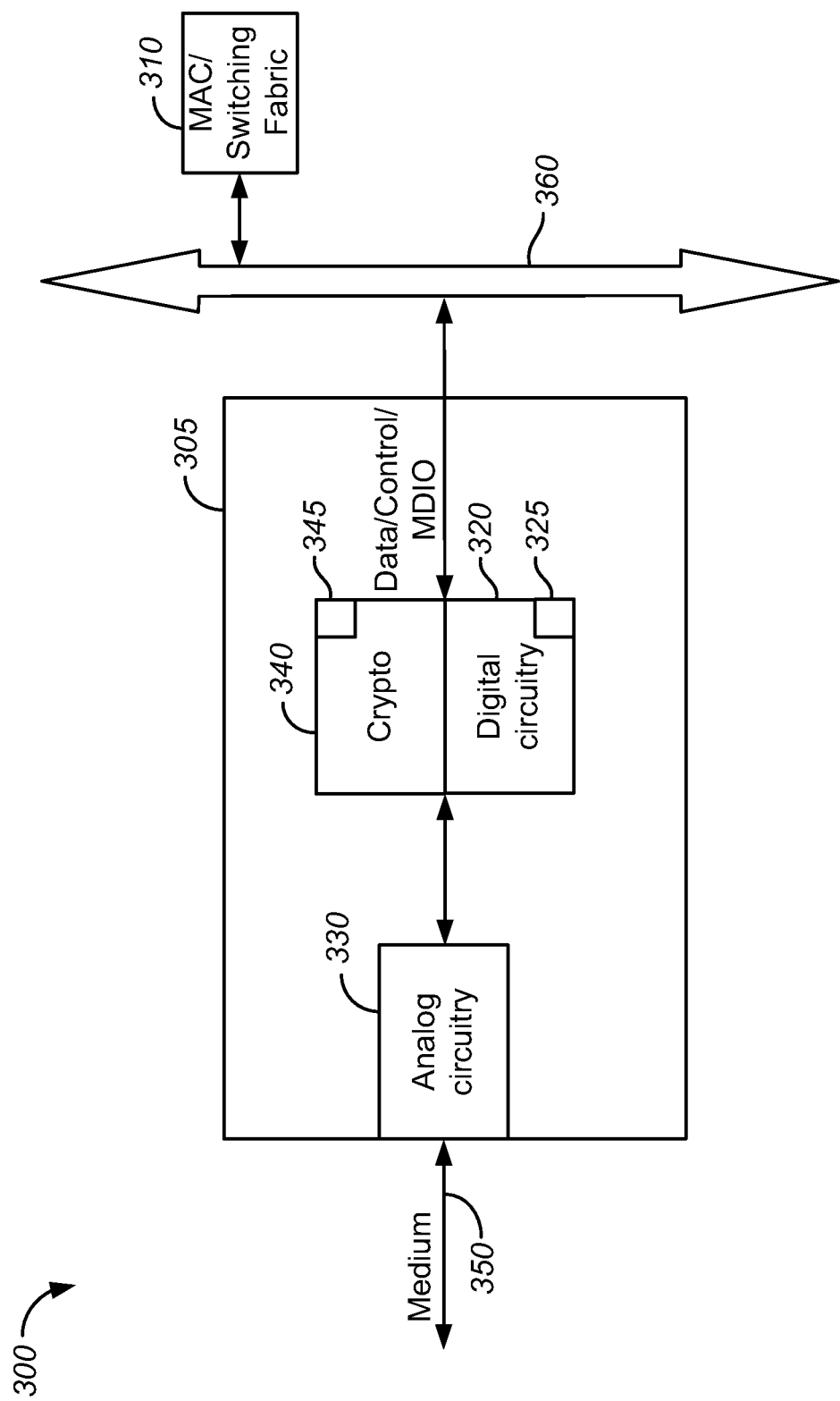
FIG. 3 is a conceptual block diagram of a PHY.

FIG. 3 is a conceptual block diagram of a further embodiment of a PHY configured in accordance with the teachings of this disclosure.

The embodiment of FIG. 3 provides that the crypto device is deployed on the same chip as the PHY, providing a single-chip link layer security solution.

The device 300 includes a MAC 310 and a PHY 305. The PHY 305 includes analog circuitry 330 configured in a receive mode for receiving data from the medium 350 and decoding the data into a form appropriate for the host device using techniques known in the art. In a transmit mode, the analog circuitry is configured to receive data from the MAC 310, and convert it into a form appropriate for the medium 350.

The PHY 305 further includes digital circuitry 320 configured for receiving data from the MAC 310 and converting the data into a form appropriate for the medium 350 in a transmit mode, and for receiving data from the analog circuitry 330 and converting it into a format appropriate for the MAC 310 in a receive mode.

The PHY 305 further includes memory and control circuitry 325 configured to control the operation of the PHY, and in particular the digital circuitry 320. The memory and control circuitry 325 will typically include circuitry to interface with the MAC 310 through a bus interface 360, such as a MII or a GMII or XGMII or XAUI or SGMII or RGMII.

The PHY 305 also includes a crypto module 340 coupled to the digital circuitry 320. The crypto module may include control and memory circuitry 345 for operation of the cryptographic functions. The crypto module 340 is preferably configured to encrypt/authenticate data received from the MAC 310 prior to presentation to the analog circuitry 330, and decrypt/authenticate data received from the analog circuitry 330 prior to presentation to the MAC 310. The crypto module may employ the cryptographic techniques disclosed above.

In a further embodiment, the crypto device 340 may be deployed using existing hardware already present in the PHY. It will be appreciated that by reusing existing hardware already present on the PHY to enable crypto features, significant real estate savings in the device may result.

It is contemplated that a wide array of PHY components may be reused when implementing the disclosed cryptographic features. For example, the crypto device may reuse the PHY's pin or interface layout, memory map, various elements of the state machine, logic gates, or even one or more of the above. Likewise, devices exist that contain multiple PHYs, such as an Octal PHY that contain 8 PHY interfaces. In these devices the reuse of pins and other elements that already exist in the PHY can reduce die and package size, thus making the devices less expensive to manufacture.

Similarly some chips incorporate the MAC as a portion of the PHY chip. In this case it may be possible to take advantage of elements from both the MAC and the PHY.

It is also contemplated that the additional functionality provided by the crypto device may be utilized for other functions or features. For example, the crypto device may be configured to perform data compression.

For example, in one embodiment, the device 300 of FIG. 3 may comprise a router in which the MAC 310 comprises an ASIC configured to also function as a switching fabric. In this case, there many be many PHYs present in the device, and by cross-utilizing the pre-existing structure of the PHY, additional security features may be added without additional chips.

In a further disclosed embodiment, the crypto device may be employed to improve the overall performance and reliability of a data transmission system.

As is appreciated by those of ordinary skill in the art, many such devices operate using a half duplex mode, where a common performance issue is the collision of data packets.

It is contemplated that the additional functionality provided by the encryption device may improve collision management.

In this embodiment, the encryption memory 345 may be employed to temporarily store the data and associated security information as the packet is transmitted. If a collision is detected, the stored information may be immediately reused and resent, without the need for the processor or MAC to resend the data, or to send new security information such as a security association.

As will be appreciated by those having the benefit of this disclosure, this benefit may save processor cycle time, and may also improve performance by offloading some processing time from ASIC to the PHY.

It is contemplated that the crypto device may take advantage of certain areas of memory on the PHY. If the PHY complies with certain industry standards, such as I.E.E.E. 802.3, PHYs are provided with certain registers of memory that are reserved for specific purposes, known as the MII Management Interface. For example, registers 11-14 are reserved, and registers 16-31 are vendor-specific areas.

It is contemplated that security association database (SAD) used in the present disclosure may be directed to be written to certain areas in a predetermined order. For example, one bit in register 11 could be used to turn the crypto function on or off. Likewise, the crypto may need data, such as a key or security association, to perform a crypto function. This data could be accessed through register 12. This takes advantage of memory management techniques and structure already present. Of course, other registers may be used.

Another benefit of this disclosure may be realized as reduced traffic, as the PHY could be programmed to drop or "trash" received traffic that does not pass the decryption module. In this example, data that does not properly decrypt is flagged to be dropped by a subsequent module prior to being switched by the switching fabric, saving bandwidth in the switching fabric for other important functions. This could reduce the risk of an unauthorized user from bringing down a network or networked device due to denial of service attacks, thereby enhancing the reliability of the network. Alternatively, the security logic may interrupt the processor for further action.

Figure 4:
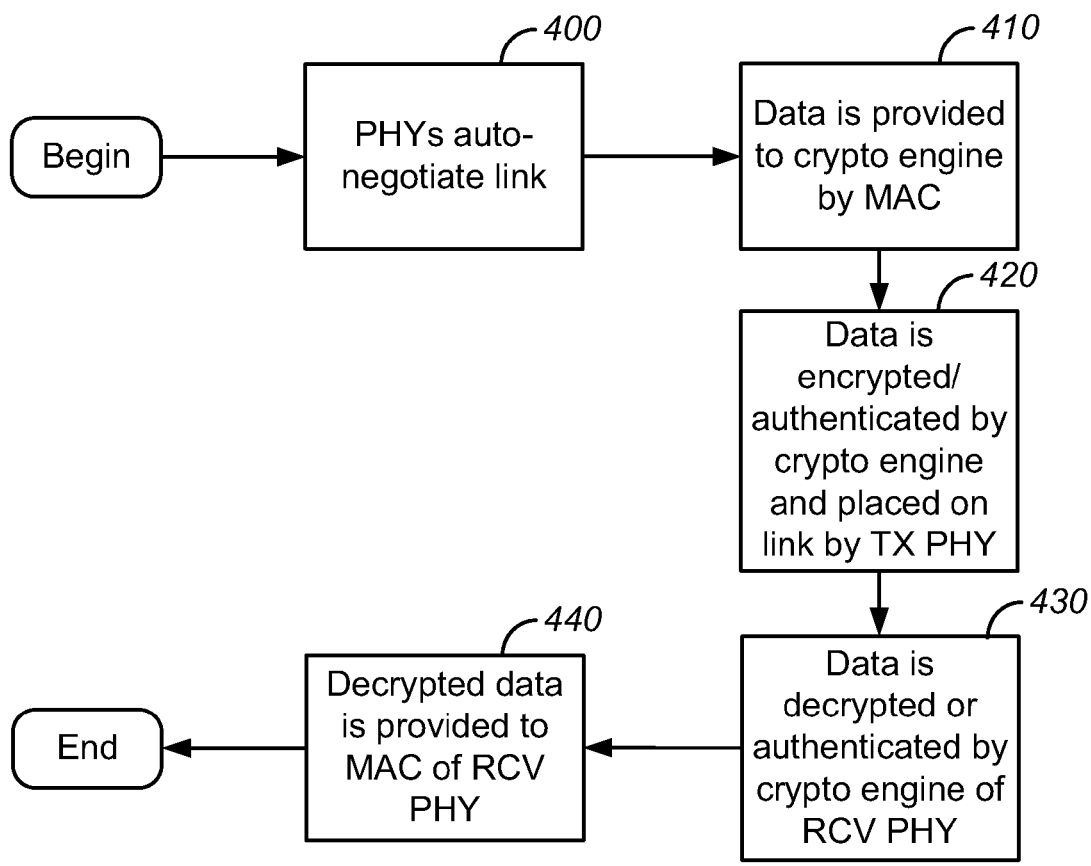
FIG. 4 is a flowchart of a method for providing link layer security.

FIG. 4 is a flowchart of a method of encrypting/authenticating data at the link layer of a data transmission system. In act 400, the PHYs wishing to communicate may auto-negotiate a link using techniques known in the art. It is to be understood that the encryption/authentication techniques disclosed herein may also be applied prior to auto-negotiation of a link.

In act 410, the MAC of the transmitting PHY ("TX PHY") provides the data to be transmitted to the crypto engine. In act 420, the data is ciphered by the crypto engine and placed on the medium linking the PHYs by the TX PHY.

In act 430, the receiving PHY ("RCV PHY") receives the cipher data from the link and presents the data to the RCV PHY's crypto engine, where the data is decrypted, authenticated, or both.

In act 440, the plain data is then passed to the MAC of the RCV PHY.

Figure 5:
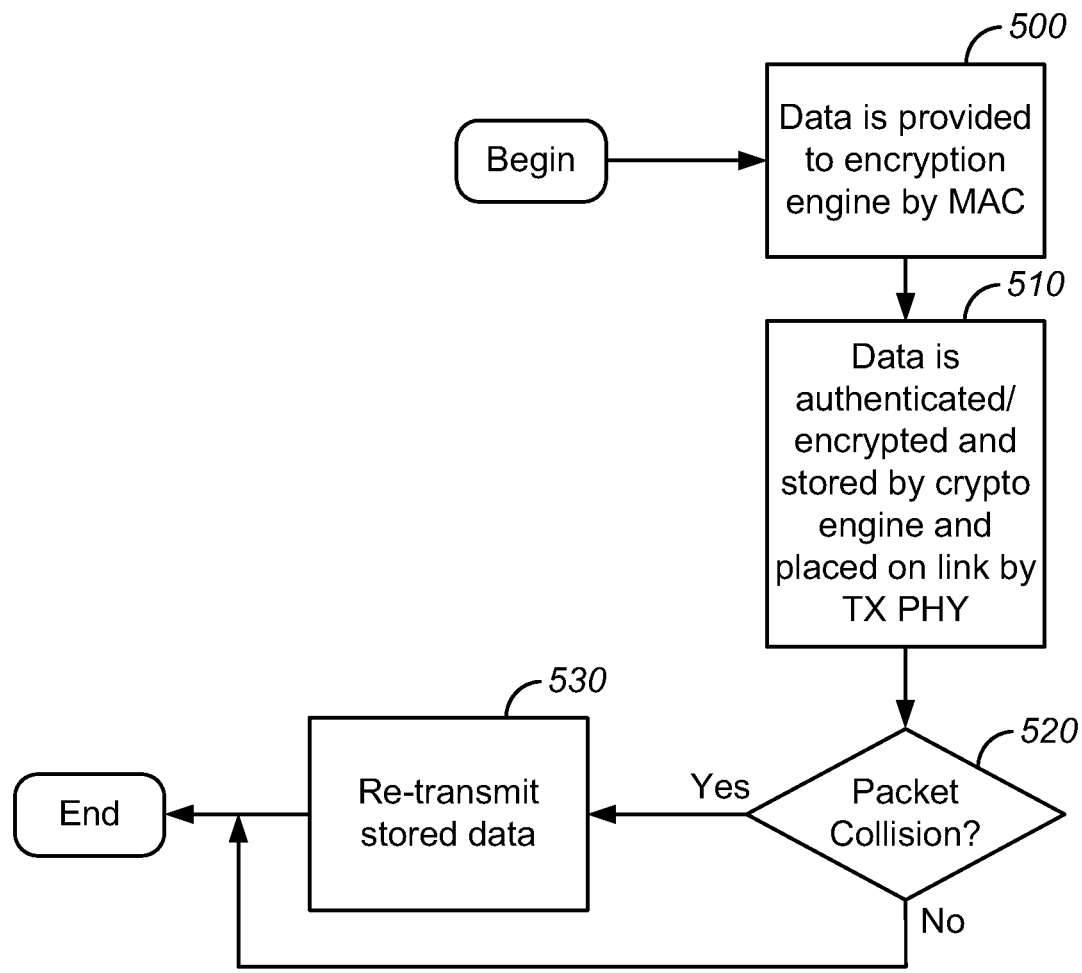
FIG. 5 is a flowchart of a method for managing packet collisions using a crypto engine.

FIG. 5 is a flowchart of a method for managing packet collisions using a crypto engine.

In act 500, the MAC of the TX PHY provides the data to be transmitted to the crypto engine. In act 520, the data is encrypted, authenticated or both by the crypto engine and placed on the medium linking the PHYs by the TX PHY. As mention above, the PHYs wishing to communicate may auto-negotiate a link using techniques known in the art, but the data may also be encrypted prior to auto-negotiation of a link. At this point, the encrypted/authenticated data is stored by the encryption engine.

In query 530, the PHY determines whether a packet collision has occurred. If a collision has occurred, the stored packet is re-transmitted by the TX PHY. If no collision occurs, the communication process proceeds as normal and any data stored could be flushed or used space reclaimed.

FIGS. 6a-6e are conceptual block diagrams showing various embodiments of providing communication between a PHY and associated security logic.

Referring generally to FIGS. 6a-6e, the device 600 includes a PHY 605 and crypto device security logic 620. It is to be understood that the disclosed embodiments may be implemented with the PHY and security logic deployed as either a one- or multiple-chip solution.

The PHY 605 and security logic 620 each include a communications module 610 and 625, respectively, configured to interface through a link 630. MAC data is presented to the PHY 605 through interface 640, and data signals are transmitted and received on the link medium 650.

In the embodiments disclosed herein, it is contemplated that any interface may be employed to communicate with the crypto device, such as MDIO/MDC (I.E.E.E. 802.3 PHY interface), S2W (Serial-to-Wire interface), I2C, or PCI (Peripheral Component Interface).

Figure 6A:
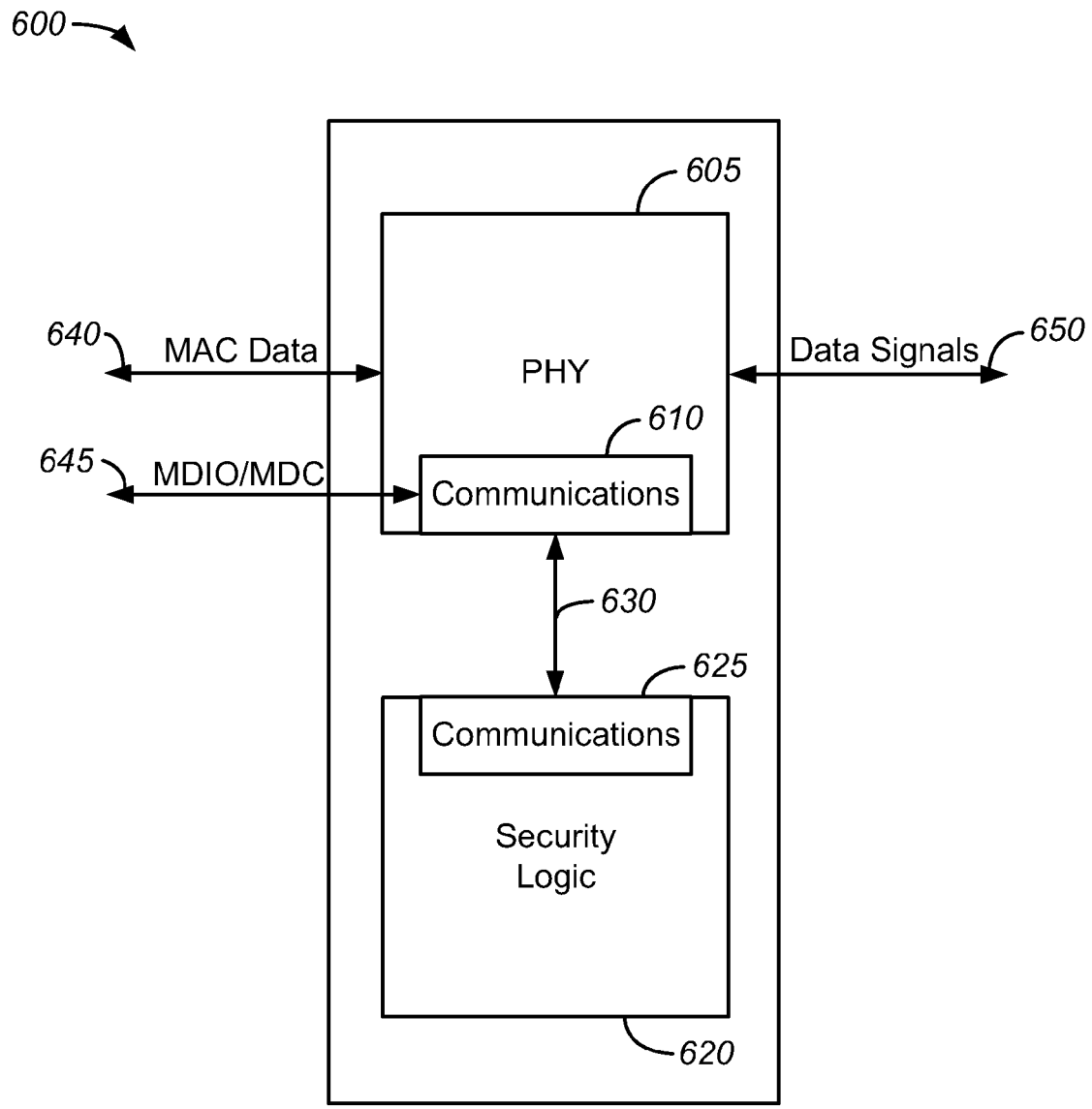
FIGS. 6a-6e are conceptual block diagrams showing various embodiments of providing communication between a PHY and associated security logic.

Referring first to FIG. 6a, an embodiment is disclosed where the MDIO/MDC interface 645 of the PHY 605 is utilized to control the crypto process. The security information is passed to the PHY using the MDIO/MDC interface, and the PHY then decodes the security information and controls the security logic by communicating through the link 630.

In this embodiment, the security information may be passed to predetermined memory registers in the communications module 610 of the PHY 605, and then communicated to the security logic 620 using control signals, a FIFO, or other techniques known in the art, such as a state machine.

In a further embodiment, the communications modules of the PHY and security logic may be configured such that only security parameters are communicated over the link.

Figure 6B:
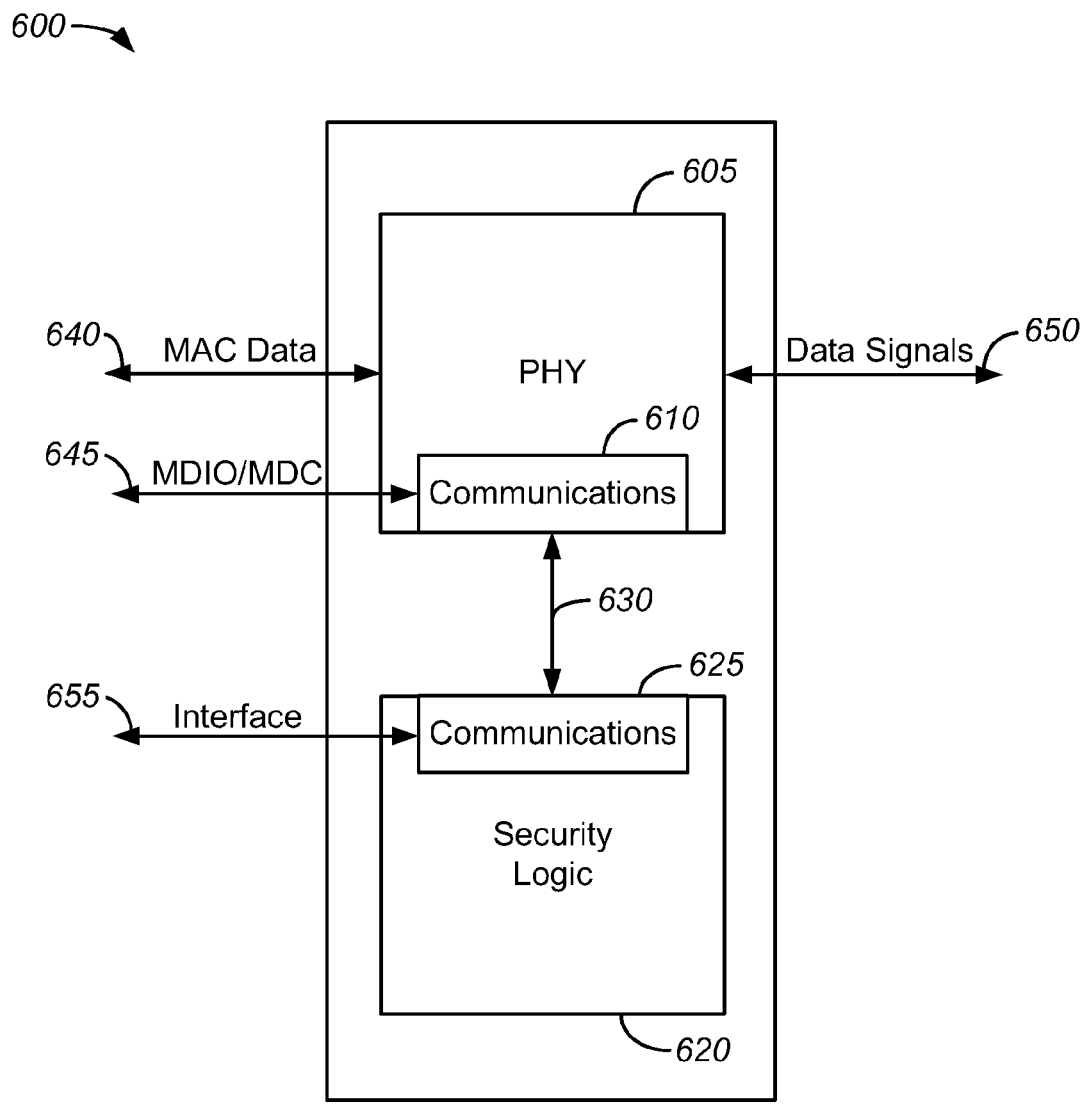

Referring now to FIG. 6b, an embodiment is shown where an interface 655 is provided that operates using a protocol other than MDIO/MDC. This embodiment uses separate interface 655 coupled directly to the communications module 625 of the security logic 620. Thus, the crypto information is provided directly to the crypto device at the PHY layer.

Figure 6C:
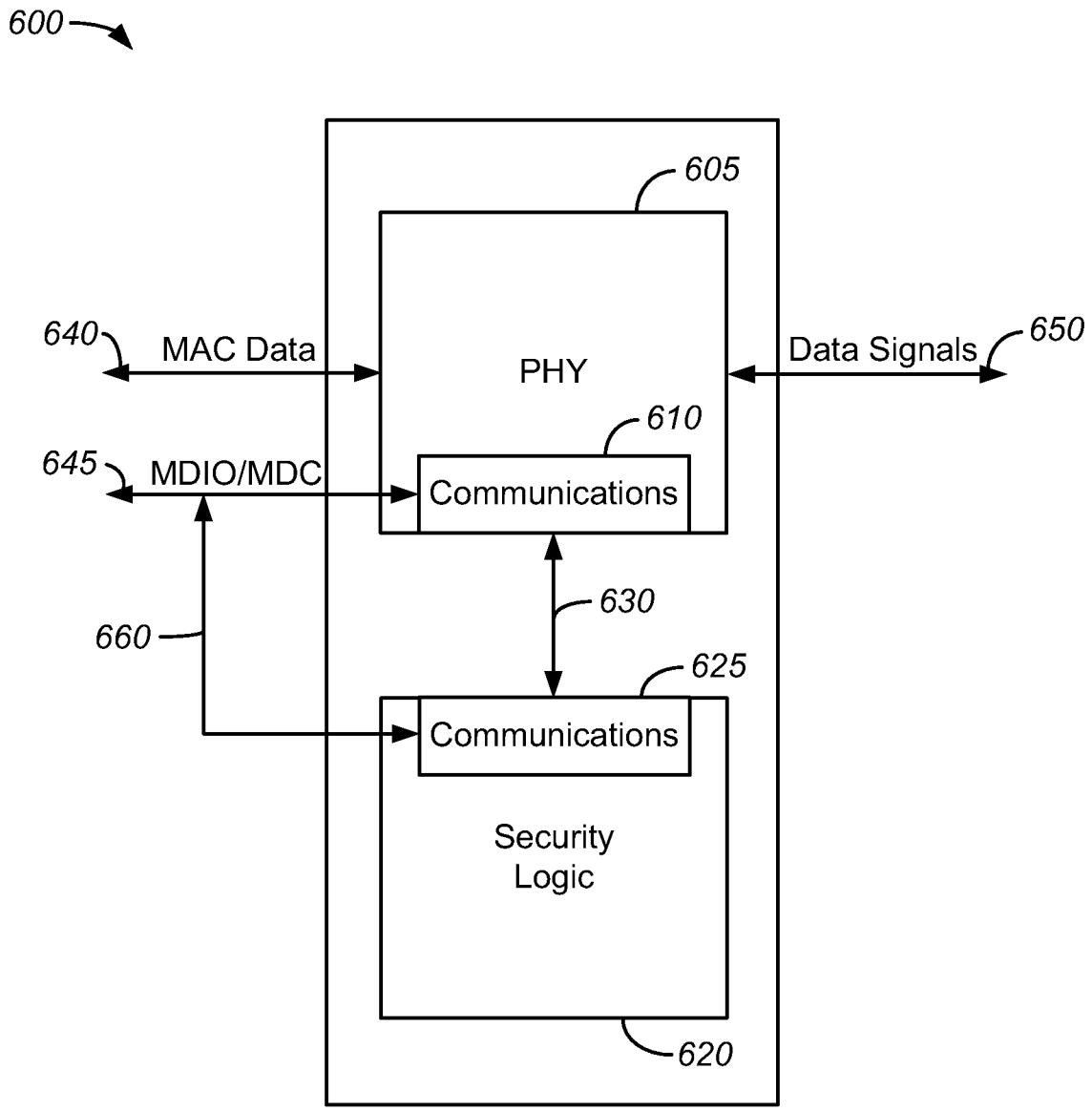

Referring now to FIG. 6c, an embodiment is shown whereby PHY logic is incorporated in to the security logic and coupled to the PHY through link 660, and the MDIO/MDC interface 645 is utilized to control both the PHY 605 and security logic 620.

This embodiment thus provides the MDIO/MDC interface to both the PHY and security logic. It is contemplated that in this embodiment, the PHY and the security logic may be configured to read separate areas of the PHY register memory space. It is further contemplated that this embodiment is especially advantageous for single-chip solutions.

Figure 6D:
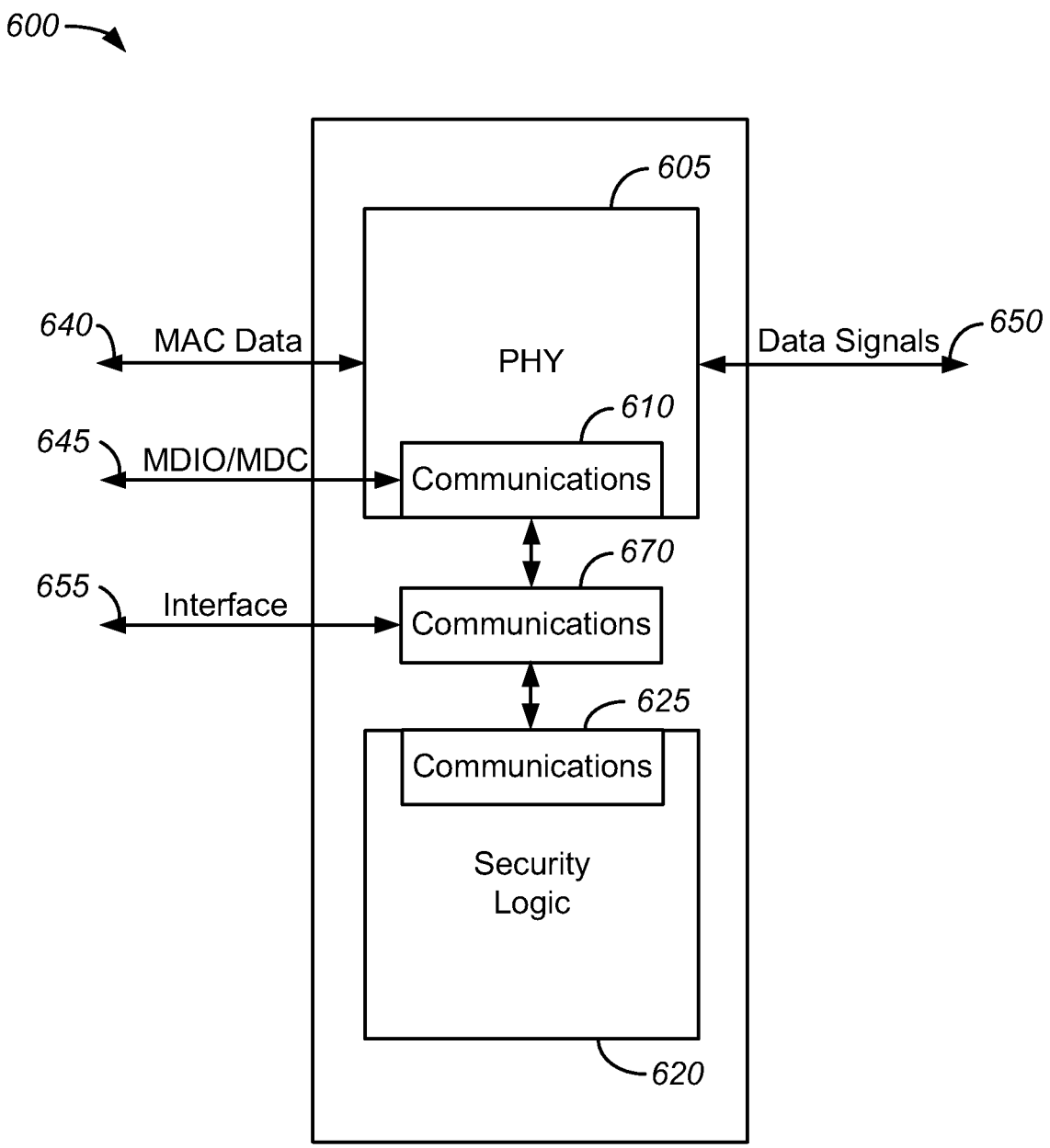

Referring now to FIG. 6d, an embodiment is shown where a master communications module 670 is provided to interface with link 655. In this embodiment, the master communications module 670 is provided to provide connectivity using a communications protocol other than the MDIO/MDC protocol.

The master communications module 670 is then coupled to both the PHY and security logic to provide control to each. The master communications device 670 may communicate with the PHY 605 and security logic 620 using an MDIO/MDC interface.

It will be appreciated that the MDIO/MDC interface may be optional, and control may be provided through the interface link 655.

Figure 6E:
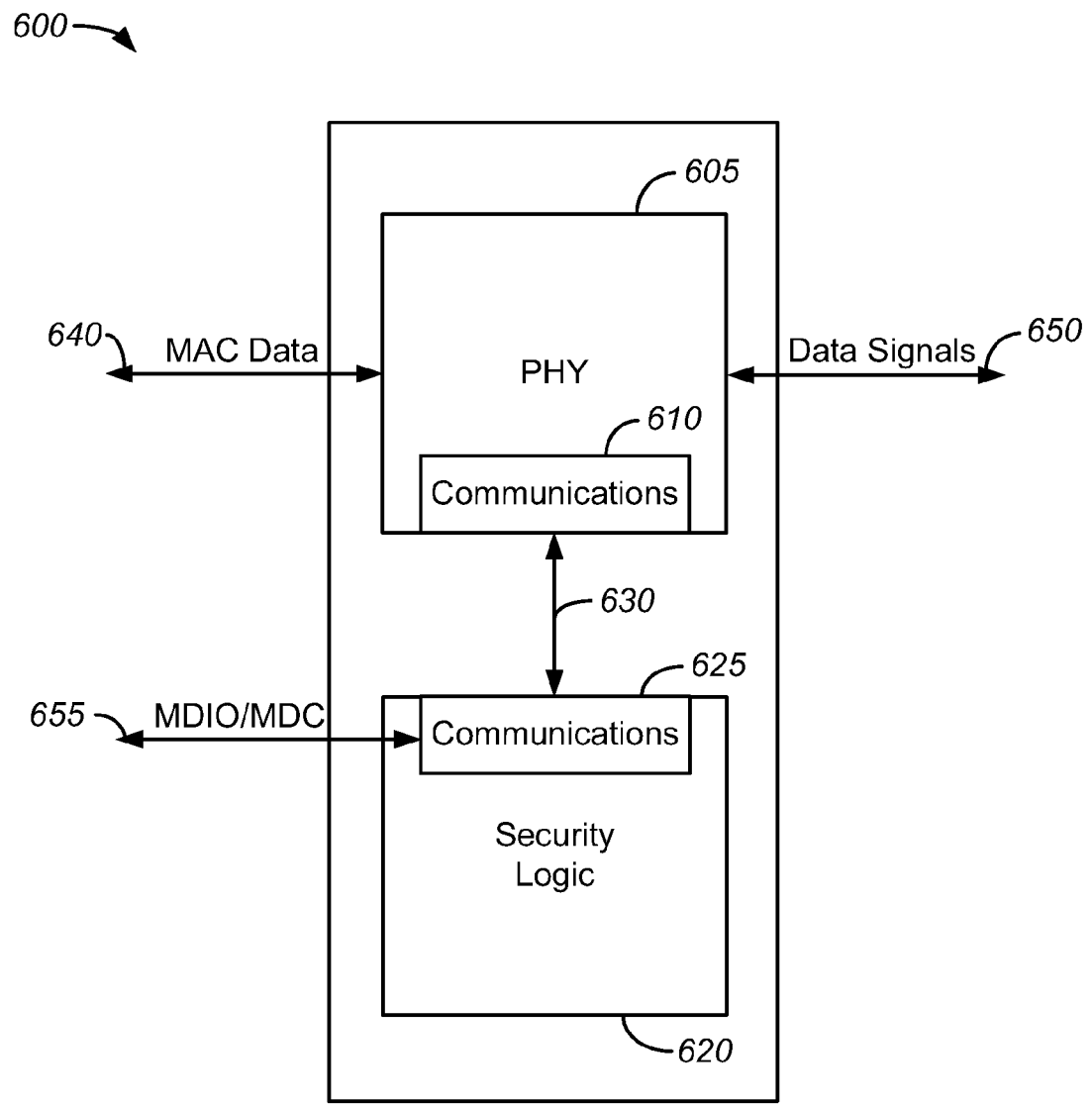

Referring now to FIG. 6e, an embodiment is provided where the MDIO/MDC interface 655 is provided directly to the security logic, and the communications module 625 of the security logic 620 provides control signals for the PHY 605. The security logic 620 and PHY 605 may communicate using an MDIO/MDC interface. It is contemplated that mirror registers may be provided in the communications modules of both the PHY and security logic.

In a further embodiment, the communications module of the security logic may be configured to interface using a protocol other than the MDIO/MDC protocol, and then control the PHY using an MDIO/MDC interface. It is contemplated that this embodiment may be useful to control multiple devices residing on the same chip.

Additionally, the communications modules of the PHY and security logic may be configured such that only security parameters are communicated over the link.

In a further embodiment, the security logic may be configured to periodically poll the registers of the PHY and update the contents of the registers of the security logic. Additionally, cache memory may be provided to allow the PHY to communication through the security device using memory paging techniques.

While embodiments and applications of this disclosure have been shown and described, it would be apparent to those skilled in the art that many more modifications and improvements than mentioned above are possible without departing from the inventive concepts herein. The disclosure, therefore, is not to be restricted except in the spirit of the appended claims.

What is claimed is:

1. An apparatus for providing link layer security in a Physical Layer Transceiver (PHY) comprising:
    analog circuitry configured to transmit to, and receive data from, a data transmission medium;
    digital circuitry coupled to said analog circuitry, said digital circuitry configured to transmit data/control signals to, and receive data/control signals from, a Media Access Controller (MAC);
    a PHY communications module coupled to said analog and digital circuitry;
    a crypto engine coupled to said digital circuitry;
    a crypto communications module coupled to said crypto engine; and
    an interface link operatively coupling said PHY communications module to said crypto communications module;
    wherein cryptographic features provided by the crypto communications module are implemented via existing hardware components of the PHY.

2. The apparatus as recited in claim 1, further comprising a master communications module configured for communication with said PHY communications module and said crypto communications module via said interface link.

3. The apparatus as recited in claim 1, wherein said PHY communications module is configured to provide connectivity through a communication medium.

4. The apparatus of claim 3, wherein said communication medium is configured to communicate with a plurality of devices.

5. The apparatus of claim 4, wherein said plurality of devices include at least one device that communicates at the PHY level and at least one device that performs security functions.

6. The apparatus as recited in claim 3, wherein said communication medium communicates with at least one device that performs both PHY and security functions.

7. The apparatus as recited in claim 1, wherein the PHY is configured to flag the traffic that does not pass the decryption for dropping by another module.

8. The apparatus as recited in claim 1, wherein the PHY is configured to drop traffic that does not pass the decryption or flag the traffic that does not pass the decryption for dropping by another module.

9. The apparatus as recited in claim 1, where the PHY controls the operation of the crypto communications module.

10. An apparatus, comprising:
analog circuitry configured to transmit to, and receive data from, a transmission medium;
digital circuitry coupled to said analog circuitry, said digital circuitry configured to transmit data/control signals to, and receive data/control signals from, a Media Access Controller (MAC);
a Physical Layer Transceiver (PHY) communications module coupled to the analog and digital circuitry; and
a crypto module coupled to the digital circuitry;
wherein the PHY communications module is configured to provide connectivity through a MDIO/MDC interface; and
wherein the crypto communications module is configured to provide connectivity through an interface other than a MDIO/MDC interface;
wherein at least a portion of the crypto communications module is implemented via existing hardware components of the PHY.

11. An apparatus, comprising:
analog circuitry configured to transmit to, and receive data from, a data transmission medium;
digital circuitry coupled to said analog circuitry, the digital circuitry configured to transmit data/control signals to, and receive data/control signals from, a Media Access Controller (MAC); and
a crypto means configured to perform cryptographic functions, store data and security information during transmission of data, and resend the stored data without use of the MAC upon detection of a collision, wherein the cryptographic functions include decryption;
a Physical Layer Transceiver (PHY) communications module configured to communicate with the analog and digital circuitry.

12. The apparatus as recited in claim 11, wherein the PHY communications module is configured to provide connectivity through a MDIO/MDC interface, and the crypto means is configured to provide connectivity through an interface other than a MDIO/MDC interface.

13. The apparatus as recited in claim 11, wherein at least a portion of the crypto means is implemented via existing hardware components of the PHY communications module.

14. The apparatus as recited in claim 11, wherein the PHY communications module is configured to drop traffic that does not pass the decryption or flag the traffic that does not pass the decryption for dropping by another module.

15. An apparatus, comprising:
analog circuitry configured to transmit to, and receive data from, a data transmission medium;
digital circuitry coupled to said analog circuitry, said digital circuitry configured to transmit data/control signals to, and receive data/control signals from, a Media Access Controller (MAC); and
a crypto module operatively coupled to the digital circuitry and configured to perform cryptographic functions including at least one of encryption or decryption; and
a Physical Layer Transceiver (PHY) communications module configured to communicate with the analog and digital circuitry;
wherein at least a portion of the crypto module is implemented via existing hardware components of the PHY.

16. The apparatus as recited in claim 15, wherein the crypto module is configured to encrypt or authenticate data received from the MAC, and decrypt or authenticate data received from the analog circuitry prior to presentation to the MAC.

17. The apparatus as recited in claim 15, wherein the PHY communications module is configured to provide connectivity through a MDIO/MDC interface, and the crypto module is configured to provide connectivity through an interface other than a MDIO/MDC interface.

18. The apparatus as recited in claim 15, wherein the PHY communications module is configured to provide connectivity through a communication medium.

19. The apparatus as recited in claim 18, wherein the communications medium is configured to communicate with a plurality of devices.

20. The apparatus as recited in claim 19, wherein the plurality of devices comprise at least one device that communicates at the PHY level, and at least one device that performs security functions.

21. The apparatus as recited in claim 18, wherein the communication medium communicates with at least one device that performs both PHY and security functions.

* * * * *